United States Patent [19]

Soltwedel et al.

[11] Patent Number: 5,624,978
[45] Date of Patent: Apr. 29, 1997

[54] CONDUCTIVE, INTERNALLY LUBRICATED BARRIER COATING FOR METAL

[75] Inventors: Jeffrey N. Soltwedel; Karl P. Anderson; Lori E. Witherup; Wendy M. Holtmann, all of Columbus; John R. Sekerak, Dublin, all of Ohio

[73] Assignee: Morton International, Inc., Chicago, Ill.

[21] Appl. No.: 330,474

[22] Filed: Oct. 28, 1994

Related U.S. Application Data

[63] Continuation-in-part of Ser. No. 237,953, May 3, 1994, abandoned, which is a continuation of Ser. No. 753,250, Aug. 30, 1991, abandoned, which is a continuation-in-part of Ser. No. 604,777, Oct. 29, 1990, Pat. No. 5,082,698, which is a division of Ser. No. 165,529, Mar. 8, 1988, Pat. No. 5,001,173, which is a continuation-in-part of Ser. No. 48,281, May 11, 1987, abandoned.

[51] Int. Cl.$^6$ ........................................ C08K 3/24
[52] U.S. Cl. .................. 523/402; 523/435; 523/442; 523/451; 523/456; 523/458; 523/460; 523/406
[58] Field of Search .................. 523/435, 456, 523/458, 442, 460, 451, 402, 406; 525/121

[56] References Cited

U.S. PATENT DOCUMENTS

| | | | |
|---|---|---|---|
| 3,293,203 | 12/1966 | Paulus | 525/121 |
| 3,713,904 | 1/1973 | Bernath et al. | 148/6.16 |
| 4,026,710 | 5/1977 | Kennedy | 148/6.2 |
| 4,179,542 | 12/1979 | Christofas et al. | 523/460 |
| 4,425,451 | 1/1984 | Sekmakas et al. | 523/402 |
| 4,461,851 | 7/1984 | Hashimoto | 521/110 |
| 4,544,213 | 10/1985 | Long et al. | 312/183 |
| 4,544,686 | 10/1985 | Bromley et al. | 523/402 |
| 4,554,061 | 11/1985 | Ritchie | 523/402 |
| 4,655,966 | 4/1987 | Guillaumon et al. | 252/518 |
| 4,684,677 | 8/1987 | Higgenbotham et al. | 523/435 |
| 4,720,403 | 1/1988 | Jasenof et al. | 523/458 |
| 4,945,126 | 7/1990 | Crosby et al. | 525/121 |
| 5,001,173 | 3/1991 | Anderson et al. | 523/402 |
| 5,008,135 | 4/1991 | Giordano et al. | 525/121 |
| 5,082,698 | 1/1992 | Anderson et al. | 427/386 |
| 5,104,583 | 4/1992 | Richardson | 252/518 |
| 5,114,756 | 5/1992 | Mirabeau et al. | 428/448 |
| 5,177,126 | 1/1993 | Moore et al. | 523/458 |
| 5,218,031 | 6/1993 | Nayder | 523/406 |
| 5,272,187 | 12/1993 | Gross et al. | 523/402 |

FOREIGN PATENT DOCUMENTS

| | | |
|---|---|---|
| 3908031 | 9/1990 | Germany . |
| 58-15570 | 1/1983 | Japan . |

*Primary Examiner*—Veronica P. Hoke
*Attorney, Agent, or Firm*—Robert M. Didrick; Gerald K. White

[57] ABSTRACT

This invention relates to aqueous epoxy resin-containing compositions useful for depositing coatings on metallic substrates in order to protect substrates against corrosion. The aqueous compositions generally comprise (A) an organic resin component consisting essentially of at least one water-dispersible or emulsifiable epoxy resin; (B) a non-ionic emulsifier, (C) chromium trioxide, (D) a conductive pigment, (E) water, and, optionally, polytetrafluoroethylene as a lubricant. The compositions may also contain phosphoric acid or an alkylphosphoric acid. These compositions are useful in coil coating operations to improve the electrocoatability of a metal substrate, in particular, steel, galvanized or aluminized substrates. The basecoated metal can then be conventionally coated or electro coated with weldable or non-weldable primer coatings and may be followed by the application of decorative topcoats. The invention also relates to metal substrates which have been coated with the pretreatment coating and, optionally, the weldable or non-weldable primer coatings.

18 Claims, No Drawings

CONDUCTIVE, INTERNALLY LUBRICATED BARRIER COATING FOR METAL

This is a continuation-in-part of application Ser. No. 08/237,953, filed on May 3, 1994 now abandoned; which was a continuation of application Ser. No. 07/753,250, filed on Aug. 30, 1991, now abandoned; which was a continuation-in-part of application Ser. No. 07/604,777, filed on Oct. 29, 1990, now U.S. Pat. No. 5,082,698; which was a divisional of Ser. No. 07/165,529, filed Mar. 8, 1988, now U.S. Pat. No. 5,001,173; which was a continuation-in-part of application Ser. No. 07/048,281 now abandoned, filed on May 11, 1987.

TECHNICAL FIELD

This invention relates to an aqueous epoxy resin-containing composition which is useful for depositing coatings on metallic substrates in order to protect their surfaces against corrosion. It relates particularly to aqueous coil coating compositions which render the substrates capable of severe drawing without sacrificing corrosion protection or electrocoatability. More particularly, it relates to cold rolled steel, electrogalvanized steel (pure zinc and zinc-nickel) and aluminized steel substrates having a corrosion inhibiting, electroconductive, weldable barrier forming film thereon which has a very low coefficient of friction.

BACKGROUND OF THE INVENTION

Various types of liquid coating compositions have been applied to metallic substrates and baked thereon in order to protect the substrates against corrosion. Certain of such coatings are applied in conventional metal coil coating processes, and they must be sufficiently adherent and flexible to resist cracking, chipping and peeling. Their attributes and their shortcomings are discussed in U.S. Pat. No. 5,001,173 which has an assignee in common with this application and which is incorporated herein by reference.

An aqueous barrier coating composition containing an epoxy resin and chromium trioxide is disclosed in U.S. Pat. No. 5,001,173 and one containing polytetrafluoroethylene as a permanent internal lubricant is disclosed in copending patent application Ser. No. 08/237,953 filed on May 3, 1994, now abandoned which also has an assignee in common with the instant application and which also is incorporated herein by reference.

Some of the most popular corrosion resistant coatings currently in commercial use also have internal lubricants but must be washed off before primer and finish paints are applied electrostatically; corrosion resistance is thus lost and nothing is done for paint adhesion. The loss of corrosion resistance means that sheets and parts must be removed from an E-coat line whenever the line is shutdown for cleaning and maintenance. Zinc residues from some prior art corrosion preventing compositions gum up the washing and disposal equipment. Excellent die lubrication is afforded to metal stamping operations by the internally lubricated coating of the aforementioned '953 application but the coating weight necessary for such lubrication causes the organic barrier to also act as an insulator, reducing the surface conductivity of the coated substrate.

Another problem that must be solved when metal substrates are to be protected from corrosion is the growing demand for weldable coated sheets. Due to the physical limitations of inhibitive pigment concentration and the thickness of the films provided, it is difficult to provide both adequate corrosion resistance and weldability. Often, the choice is between the use of a higher current to produce the weld or decreasing the thickness of the protective film.

Primers and finish coating compositions are known to contain electrically conductive pigments so as to facilitate the electrostatic spraying of substrates coated therewith. The conductive pigments and coating compositions containing them are described in Japanese Unexamined Patent Publication 62-181371, and U.S. Pat. Nos 4,655,966 and 5,114,756; the U.S. patents are incorporated herein by reference. None of these publications describe a coating composition which contains chromic acid as a corrosion preventing additive.

SUMMARY OF THE INVENTION

It is an object of this invention, therefore, to provide an aqueous coating composition which renders the substrates capable of severe drawing without sacrificing corrosion protection or electrocoatability.

It is a related object of this invention to provide a permanent, corrosion resistant, internally lubricated coating for metal substrates.

It is a related object of this invention to provide cold rolled steel, electrogalvanized steel (pure zinc and zinc-nickel), and aluminized steel substrates having a corrosion inhibiting, electroconductive, weldable barrier forming film thereon which has a very low coefficient of friction.

It is yet another object to provide a basecoating composition which can be quenched and thus be simultaneously applied to both sides of a moving coil strip in contrast to some commercially available basecoatings which remain water-soluble after their application to the coil and even after their initial baking.

These and other objects of this invention which will become apparent from the following description of the invention are achieved by an aqueous coil coating composition which comprises (A) an organic resin component consisting essentially of at least one water-dispersible or emulsifiable epoxy resin (B) a non-ionic emulsifier, (C) chromium trioxide, (D) a conductive pigment, and (E) water.

The aqueous compositions are corrosion-preventing, water-borne liquid pretreating basecoat compositions for metallic substrates, said composition having a bake temperature of about 390° F. to 450° F. to provide a flexible crack-resistant coating on cold rolled steel, hot-dip galvanized, copper, electrogalvanized (zinc and zinc-nickel), and aluminized metal substrates. These aqueous compositions are useful to provide pretreatment coatings on metal substrates used in the automotive, office furniture, appliance, electric motor, and computer industries. This pretreatment coating can be coated with weldable or non-weldable primer coatings followed by the application of decorative topcoats such as appliance topcoats or automotive topcoats. The basecoated metal can be conventionally coated with weldable or non-weldable primer coatings and may be followed by the application of decorative topcoats. Alternatively, the basecoated metal may be electrocoated with weldable or non-weldable primer coatings and/or electrocoated with decorative topcoats. The invention also relates to metal substrates which have been coated with the pretreatment coating and, optionally, the weldable or non-weldable primer coatings.

DESCRIPTION OF THE PREFERRED EMBODIMENTS

The organic resin component of the aqueous compositions of the present invention is based upon water-dispersible or emulsifiable epoxy resins. In one embodiment, the organic resin component will comprise a mixture of resins containing at least 50% by weight of at least one water-dispersible or emulsifiable epoxy resin. In another embodiment, the organic resin component of the aqueous compositions of the present invention may comprise, in addition to the epoxy resin, other resins in amounts such as to provide aqueous compositions containing mixtures of resins which may contain less than 50% by weight of epoxy resin. In another embodiment of the invention, the aqueous coil coating compositions of this invention include polytetrafluoroethylene (PTFE) as a lubricant. In yet another, the organic resin component may be any thermosettable organic resin, a curing agent for such resin, a corrosion inhibitor selected from the group consisting of a convertible chromium compound, phosphoric acid or a salt or an ester of a phosphoric acid, or a mixture of two or more of said inhibitors.

The water-dispersible or emulsifiable epoxy resins used in this invention may be any one of a number of well known epoxy resins which are characterized by the presence therein of at least one epoxide group. As used in the specification and in the appended claims, the term "epoxy resin" is intended to describe the reaction products of the condensation reaction of an epihalohydrin and a hydroxy-containing compound or carboxylic acid. The epoxy resins may be of the ether or ester types although the ether type epoxy resins are preferred.

Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins are obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. Generally, however, the principal product may be represented by sorbitol, and polyepichlorohydrins; from cy-cloaliphatic alcohols such as resorcitol, quinitol, bis-(4-hydroxycyclohexyl)methane, and 2,2-bis(4-hydroxycyclohexyl) propane, and from alcohols having aromatic nuclei, such as N,N-bis(2-hydroxyethyl)aniline and p,p'-bis (2-hydroxyethylamino)diphenylmethane. Or they may be made from mononuclear phenols, such as resorcinol and hydroquinone, and from polynuclear phenols, such as bis-(4-hydroxyphenyl) methane (otherwise known as bisphenol F), 4,4'-dihydroxydiphenyl, bis(4-hydroxyphenyl) sulphone, 1,1,2,2-tetrakis(4-hydroxyphenyl) ethane, 2,2-bis(4-hydroxyphenyl)propane, (otherwise known as bisphenol A), 2,2-bis(3,5-dibromo-4-hydroxyphenyl)propane, and novolacs formed from aldehydes such as formaldehyde, acetaldehyde, chloral, and furfuraldehyde, with phenol itself, and phenol substituted in the ring by chlorine atoms or by alkyl groups each containing up to 9 carbon atoms, such as 4-chlorophenol, 2-methylphenol, and 4-tert-butylphenol.

The value of n in Formula I is determined by the relative concentration of epichlorohydrin reactant to the polyhydroxy compound. The greater the concentration of epichlorohydrin, the lower the value of n. In general, the value of n determines many of the characteristics of the epoxy resin. For example, the resin generally is a liquid at room temperatures for values of n between 0 and about 3 and solid for values of n greater than about 3. The physical properties of the final hardened resin also are determined by the value of n since, as the value of n increases, the amount of cross-linking in the resin is increased resulting in a resin of greater strength and durability.

The epoxy resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic) alkane or a tetrakis-(hydroxy-aromatic) alkane with a halogen-substituted aliphatic epoxide in the presence of a base such as, for example, sodium hydroxide or potassium hydroxide.

In one preferred embodiment, the epoxy resins are diglycidyl ethers of bisphenols, especially bisphenol A. These are made by reacting epichlorohydrin with bisphenol A in the presence of an alkaline catalyst. By controlling the operating conditions and varying the ratio of epichlorohydrin to bisphenol A, products of different molecular weight can be made.

Other usable epoxy resins include the diglycidyl ethers of other bisphenol compounds such as bisphenol B, F, G and H.

Epoxy resins of the type described above based on various bisphenols are available from a wide variety of commercial sources. One group is known by the general trade designation "Epon" resins and are available from Shell Chemical Company. For example, "Epon 820" is an epoxy resin Formula I (I)

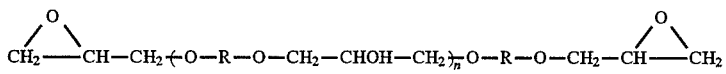

wherein n is an integer of from zero to 30 or more, and R represents the divalent hydrocarbon group of a polyhydroxy compound which may be an aliphatic or aromatic polyhydroxy compound. These ethers may be made from acyclic alcohols such as ethylene glycol, diethylene glycol, and higher poly(oxyethylene) glycols, propane-1,2-diol and poly (oxypropylene) glycols, propane-1,3-diol, poly (oxytetramethylene) glycols, pentane-1,5-diol, hexane-2,4,6-triol, glycerol, 1,1,1-trimethylolpropane, pentaerythritol, having an average molecular weight of about 380 and is prepared from 2,2-bis-(p-hydroxyphenyl) propane and epichlorohydrin. Similarly, "Epon 1031" is an epoxy resin having an average molecular weight of about 616 and is prepared from epichlorohydrin and symmetrical tetrakis-(p-hydroxyphenol) ethane. "Epon 828" has a molecular weight of 350–400 and an epoxide equivalent of about 175–210. "Epon 1001" is an epoxy resin having an average molecular weight of about 1000 and an epoxide equivalent weight of 500. "Epon 1007" has an average molecular weight of about 4500 and an epoxy equivalency of about 2.0. "Epon 1009" has an epoxide equivalent of about 2400–4000.

Another group of commercially available epoxy resins is identified under the general trade designation EPI-REZ (Celanese Resins, a division of Celanese Coatings Company). For example, EPI-REZ 510 and EPI-REZ 509 are commercial grades of the diglycidyl ether or bisphenol A differing slightly in viscosity and epoxide equivalent. EPI-REZ 522 F is a bisphenol A-epichlorohydrin resin with an epoxy equivalency of about 600.

Another class of epoxy resins useful in the present invention is the epoxidized novolacs, particularly the epoxy cresol and epoxy phenol novolacs. These are produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also can be utilized in the present invention. Epoxy resins having non-benzenoid molecular structures generally are referred to in the art as being aliphatic epoxy resins or cycloaliphatic epoxy resins. Cycloaliphatics can be produced by the peracetic epoxidation of cyclic olefins and by the condensation of an acid such as tetrahydrophthalic with epichlorohydrin, followed by dehydrohalogenation. The aliphatic epoxy resins can be prepared by reacting hydroxy-containing aliphatic and cycloaliphatic compounds such as aliphatic diols and triols. For example, ethylene glycol or glycerol can be reacted with a halogen-substituted aliphatic epoxide such as epichlorohydrin (and others mentioned above) to form liquid epoxy resins characterized by viscosities which are lower than epoxy resins derived from aromatic hydroxy compounds. When cured, such aliphatic epoxy resins are not as brittle as the aromatic epoxy resins, and in many instances, exhibit elastomeric properties. Aliphatic epoxy resins are available commercially from a variety of sources including, for example, Shell Chemical Company and Reichhold Chemicals, Inc. Specific examples include Epon 562 from Shell Chemical Company having a viscosity of 90–150 centipoises at about 23° C., an epoxide equivalent of 140–165, and a hydroxyl equivalent weight of about 65.

The epoxy resins will have an epoxy equivalency greater than 1.0. By epoxy equivalence, reference is made to the average number of 1,2-epoxide groups contained in the average molecule of the glycidyl ether or ester. As a result of the method of preparing the glycidyl polyethers and polyesters, and since they are ordinarily mixtures of chemical compounds having somewhat different molecular weights, the epoxy equivalency of the products is not necessarily the integer 2.0. However, the equivalency is generally a value of between 1.0 and 2.0. Epoxidized novolac resins which are useful in the present invention generally are prepared by the reaction of epichlorohydrin with phenol formaldehyde condensates. The epoxidized novolacs may contain more than two epoxy groups per molecule, and epoxidized novolacs having up to 7 to more epoxy groups are available commercially. The use of epoxidized novolacs containing more than two epoxy groups per molecule results in products containing a highly cross-linked structure.

Ultra-high molecular weight epoxy resins also may be used in the invention. A group of such resins is available from the Shell Chemical Company under the general trade designation "Eponol". The ultra-high molecular weight resins are derived from bisphenol-A and epichlorohydrin and the value of n in Formula I for Eponol Resin 53-BH-35 is about 90 whereas n is about 130 for the product identified as Eponol Resin 55-BH-30.

The organic resin component of the aqueous compositions of the present invention may comprise mixtures of epoxy resins with other water-dispersible or emulsifiable resins which are effective for modifying the properties of the epoxy resins and/or the coatings which are deposited on metal substrates from the aqueous compositions. In one preferred embodiment, the resin component comprises a mixture of an epoxy resin and at least one halogen-containing thermoplastic polymer. Halogen-containing vinyl polymers and copolymers, including vinylidene chloride homopolymers and copolymers are useful in combination with the epoxy resins. Vinylidene chloride copolymers include copolymers of vinylidene chloride with vinyl chloride, acrylates or nitriles, the choice of comonomers being dependent upon the properties desired. Polyvinylidene fluoride resins useful in combination with the epoxy resins of the present invention are available commercially from a variety of sources including Pennwalt Corporation. One specific example of a polyvinylidene fluoride available from Pennwalt is Kynar 500 resin.

The resin component of the aqueous compositions of the present invention also may comprise mixtures of epoxy resins with other resins capable of modifying the properties of the epoxy resin such as amine-formaldehyde resins, phenolformaldehyde resins, polyamide resins, urea resins, polyolefins, polyesters, etc. as long as the additional resins do not result in a substantial decrease of other desirable properties such as adhesion, corrosion-resistance, weldability, etc.

Among the polyesters which are useful in conjunction with epoxy resins in the aqueous compositions of the present invention are polyesters of aromatic dibasic acids and alkylene glycols. The polyesters also may be derived from a mixture of aromatic dicarboxylic acids containing at least some symmetrical aromatic dicarboxylic acid, one or more acyclic dicarboxylic acids, and one or more diols. Examples of symmetrical aromatic dicarboxylic acids include terephthalic acid, bibenzoic acid, ethylene bis-p-oxy benzoic acid, tetramethylene bis-p-oxy benzoic acid, and 2,6-naphthalic acid. Other aromatic dicarboxylic acids which can be used in conjunction with the symmetrical dicarboxylic acid include o-phthalic, isophthalic acid, etc.

The glycols which are reacted with the dibasic acids to form the desired linear polyesters are glycols represented by the formula

HO(Y)OH     (II)

wherein Y is an alkylene group containing from about 2 to about 10 carbon atoms. Examples of such glycols include ethylene glycol, 1,2- and 1,3-propanediol, 1,4-butanediol, neopentyl glycol, 1,6-hexanediol, polyethylene glycol, etc.

Representative of the acyclic dicarboxylic acids which can be incorporated into the polyesters are those characterized by the formula

HOOCCH2XCH2COOH     (III)

wherein X is a linear chain composed from 2 to about 8 atoms.

In one embodiment, mixtures of two or more acyclic dicarboxylic acids are utilized, and the acyclic dicarboxylic acids in the mixture will differ from each other by at least 3 carbon atoms in the linear chain. Specific examples of the acyclic dicarboxylic acids represented by the above Formula III include adipic acid, pimelic acid, suberic acid, azelaic acid, oxy-dibutyric acid, sebacic acid, 5-oxa-1,10-decanedioic acid, 4-n-propyl suberic acid, dodecane dioic acid, tridecane dioic acid, etc. Particularly useful combinations of aromatic and aliphatic dicarboxylic acids used in the preparation of copolyesters useful in the present invention include: terephthalic acid, azelaic acid and pentamethyleneglycol; terephthalic acid, isophthalic acid and adipic acid; terephthalic acid, isophthalic acid, adipic acid and sebacic acid; terephthalic acid, isophthalic acid, adipic acid and ethylene glycol; etc. Copolyesters of such mixtures can be prepared by known techniques, and they may be prepared directly from the above-identified dicarboxylic acids, or the copolyesters can be prepared from the lower alkyl esters of said dicarboxylic acids such as dimethyl terephthalate, dimethyl isophthalate, dimethyl sebacate, dimethyl adibate, etc. Procedures for preparing copolyesters useful in combination with the epoxy resins in this invention are described in, for example, U.S. Pat. Nos. 2,623,033 (Snyder) and 2,892,747 (Dye), both of which patents are hereby incorporated by reference for their disclosure of linear copolyesters derived at least in part from symmetrical aromatic dicarboxylic acids.

In one preferred embodiment, the polyesters which are utilized in combination with the epoxy resins are linear polyesters of aromatic dibasic acids and alkylene glycols. Generally, these polyesters are derived from a mixture of aromatic dibasic acids such as terephthalic and isophthalic acid with an alkylene glycol containing from 2 to about 6 or 8 carbon atoms in the alkylene group. Examples of such glycols include ethylene glycol, trimethylene glycol, 1,4-butylene glycol, etc. In addition to the aromatic dicarboxylic acids and the alkylene glycol, the reaction mixture also may, and preferably does contain, an acyclic dicarboxylic acid. The relative amounts of aromatic dicarboxylic acid and a cyclic dicarboxylic acid may be varied in order to obtain polyesters having different characteristics. In general, the ratio of equivalents of aromatic dicarboxylic acids to acyclic dicarboxylic acid will be from about 2:1 to about 1:2 and more generally about 1:1. The ratio of dicarboxylic acid to glycol also may be varied, and the glycol is generally present in excess amounts. Thus, ratios of dicarboxylic acids to diol generally are from about 1:1 to about 1:2.

The reaction between the dicarboxylic acid mixture and the diol generally is effected by heating the mixture to an elevated temperature in the presence of catalysts. Tin catalysts are especially useful for such purposes, and examples include dibutyl tin oxide and dibutyl tin dilaurate. Other catalysts which may be utilized include antimony oxide. The polyesters and copolyesters prepared in this manner generally will have molecular weights of from about 5000 to about 50,000 and will be further characterized as having hydroxyl numbers of between about 5 and 15.

The following are examples of polyesters which can be utilized in the compositions of the present invention. Unless otherwise indicated in the following examples, or elsewhere in the specification and claims, all parts and percentages are by weight, and all temperatures are in degrees centigrade.

Polyester Example 1:

Into a reaction vessel there is charged 387.6 parts (12.5 equivalents) of ethylene glycol, 228 parts (2.75 equivalents) of terephthalic acid, 117.6 parts (1.42 equivalents) of isophthalic acid, 396 parts (4.2 equivalents) of azelaic acid (Emerox 1144), and 0.42 part of antimony trioxide. An inert atmosphere is maintained and the mixture is heated to 240° C. with stirring while holding the vapor temperature below 125° C. A mixture of water and glycol (184 parts) is removed. When the batch temperature reaches 240° C., the reactor is adapted for vacuum processing and the pressure is reduced to about 25 mm. Hg. over 1.25 hours while raising the temperature to 250° C. The reaction is terminated 15 minutes after full vacuum is attained, and the vacuum is broken with nitrogen. The molecular weight of the polyester prepared in this manner is about 35,000, and the polyester is further characterized as having a hydroxyl number of about 8.9 and a hydroxy-to-carboxy ratio 1.06. Polyester Example 2:

A reactor is charged with 17.08 parts of ethylene glycol, 35.31 parts of neopentyl glycol, 36.81 parts of isophthalic acid, 36.83 parts of terephthalic acid, 0.07 part of dibutyl tin octoate, and 0.13 part of triphenyl phosphite. The mixture is heated to 230° C. using an inert sparge. The exhaust temperature is maintained at or below 110° C. as the reaction mixture is heated to 230° C. The mixture then is maintained at 225°–230° C. until the acid number of the mixture is below 5. When the desired acid number is attained, the reactor is adapted for vacuum, and a vacuum of 3 mm. Hg. or less is maintained at a temperature of about 250° C. This temperature and vacuum level are maintained for a period of about 7.5 hours until the viscosity of the reactor contents is approximately L (at 40% in MEK). The reaction mixture then is cooled and recovered. The molecular weight of this polyester is about 17,500 and the polyester is characterized as having a hydroxyl number of about 8.

The aqueous coil coating compositions of this invention contain a non-ionic surfactant to aid in the dispersion of the aforementioned water-dispersible or emulsifiable resins, i.e., the halogen-containing thermoplastic polymers, the thermoplastic polyesters, epoxy resins described hereinabove. The appropriate emulsifier will be present in commercially available emulsions that may be chosen for use in the coil coating compositions of this invention. Shell Chemical Company's EPI-REZ 3540-WY-55 epoxy resin emulsion, for example, contains an epichlorohydrin/bisphenol A type epoxy resin, 2-propoxyethanol, water, and a non-ionic surfactant. In general, non-ionic surfactants such as those containing ether linkages are particularly useful. Examples of such ether-containing surfactants include those having the general formula

$$RO-[(CH_2)_nO]_xH$$

wherein R is an aryl, alkaryl or alkyl, alkenyl, or alkynyl group containing from about 6 to about 30 carbon atoms, n is 2 or 3, and x is an integer from 2 to 100. Such surfactants are produced generally by treating a fatty alcohol, a phenol, or an alkyl substituted phenol with excess ethylene oxide or propylene oxide. The alkyl substituent on the phenol may contain from 9 to 24 carbon atoms. A long chain fatty alcohol is exemplified by oleyl and stearyl alcohols.

Non-ionic polyoxyethylene compounds type are described in U.S. Pat. No. 3,855,085. Such compounds are available commercially under the trademark SURFYNOL from Air Products and Chemicals, Inc. of Allentown, Pa., and under the trademarks PLURONIC and TETRONIC from BASF Wyandotte Corp. of Wyandotte, Mich. Examples of specific polyoxyethylene compounds include the SURFYNOL 465 surfactant, which is a obtained by reacting about 10 moles of ethylene oxide with 1 mole of tetramethyldecynediol. PLURONIC L 35 surfactant is obtained by reacting 22 moles of ethylene oxide with propylene glycol. Non-ionic surfactants are also available from Rohm & Haas Company under the trademark TRI- TON; TRITON CF10 is an alkaryl polyether. Also useful is the ATLOX 1045A polyoxyalkylene sorbitol oleate-laurate mixture from ICI America.

The aqueous coil coating composition contains from about 0.25% to about 15.0% by weight of a conductive pigment as exemplified by an antimony doped tin oxide on a mica support sold under the trademark MINATEC by EM Industries, Inc. Another example of a suitable conductive pigment is the potassium titanate fiber sold by Otsuka Chemical Co., Ltd. under the trademark TISMO. The TISMO 200B powder is a particular example of such pigments. Antimony/tin oxides are described in U.S. Pat. Nos. 4,655,966 and 5,104,583, which are incorporated herein by reference. Conductive pigments are available from DuPont under the names Electroconductive Powder—Mica, Electroconductive Powder—S, and Electroconductive Powder—TI.

A critical component in the aqueous compositions of the present invention is hexavalent chromium in the form of chromium trioxide, chromic acid or chromic acid anhydride. The aqueous compositions generally will contain from about 0.5 to about 5% by weight of chromium trioxide. In addition to its function as a corrosion inhibitor, the hexavalent chromium acts as the curing agent for the epoxy resin during the baking of the coating on the metal substrate.

In one embodiment, the aqueous compositions of the present invention will comprise (A) from about 2 to about 25% by weight of an organic resin component consisting essentially of at least one water-dispersible or emulsifiable epoxy resin or a mixture of resins containing more than 50% by weight of at least one water-dispersible or emulsifiable epoxy resin, (B) from about 0.05 to about 0.5% by weight of a non-ionic emulsifier, (C) from about 0.5 to about 5% by weight of chromium trioxide, (D) from about 0.001 to about 50% by weight of the total solids of polytetrafluoroethylene as a lubricant, (E) from about 0.25% to about 15% by weight of a conductive pigment, (F) from about 25 to about 97% by weight of water, and (G) from 0 to about 10% strontium chromate.

The aqueous composition of the invention also may contain (H) phosphoric acid or an alkyl phosphoric acid. Examples of alkyl phosphoric acids include the lower alkyl phosphoric acids such as methyl phosphoric acid, ethyl phosphoric acid, propyl phosphoric acid, and butyl phosphoric acid. Generally, when the aqueous compositions of the present invention contain phosphoric acid or an alkyl phosphoric acid, only small amounts such as, for example, from about 0.1 to about 3% by weight of phosphoric acid or butyl phosphoric acid are included in the aqueous compositions, and this amount is sufficient to provide improved properties.

Because the aqueous compositions of this invention which are useful for depositing pretreatment coatings (or basecoats) on metal surfaces are film-formers and have substantial amounts of epoxy resin therein, they can be applied to both sides of a metal coil, baked and then quenched. The coated coil is then ready to receive a primer coat and/or a topcoat on each side as it passes into the finished coil coating station. Alternatively, the basecoat can be used as the only coating on the coil. Since the basecoating composition can be quenched, it can be simultaneously applied to both sides of a moving coil strip in contrast to some commercially available basecoatings which remain water-soluble after their application to the coil and even after their initial baking.

As said hereinabove, one embodiment of the aqueous composition of the invention contains polytetrafluoroethylene (PTFE) as a lubricant. Other lubricants such as glycerol esters, fatty acids, fatty acid esters, fatty acid amides, fatty acid salts, fatty alcohols, and molybdenum disulfide, etc may be used but PTFE is preferred because of the exceptionally low coefficient of friction which it imparts to the coated metal panel and thereby aids the stamping of fenders, hoods and the like from the corrosion-resistant metal. Although PTFE is within the class of halogen-containing thermoplastic polymers mentioned above, its contribution of superior lubricant properties to the coating puts it into a class apart from the others mentioned as examples of the broad class, as will be demonstrated below.

The PTFE is suitably added to the epoxy resin portion of the aqueous coating composition prior to the introduction of the chromium compound or other inhibitor which may interfere with dispersing the PTFE in the coating composition as a dry powder having a particle size of from about 0.01 micron ($\mu$) to about 30 ($\mu$). Preferably, the range is from about 1 to about 13 ($\mu$) and a range of from about 3 to about 6 ($\mu$) is particularly preferred. A mixture of polyethylene (PE) and PTFE wherein the PTFE content may be as low as 1% by weight of the mixture is suitable. A powder sold by Micropowders, Inc. under the designation MP 523 XF is such a mixture wherein the PE to PTFE ratio is 3:1 and it has a maximum particle size of about 10 and a mean average size of about 5 $\mu$. MICROPOWDER 625 is essentially pure PTFE having an average particle size of 4 $\mu$ and a maximum of about 10 $\mu$. The PE/PTFE mixture is preferred because of its easy dispersibility in the resin portion of the coating composition even though the PE's contribution to the lubricant property of the resultant composition is negligible in comparison with that of the PTFE. POLYFLUO 200 from the same company and having a maximum particle size of 13 is suitable for some applications. The amount of PTFE is preferably from about 0.1 to about 10% and a particularly preferred range is from about 0.7 to about 3.5%. The other water-compatible or organic lubricants may be present in amounts of about 0.1 to about 5% by weight of the total corrosion preventing composition.

The lubricating properties of the PTFE and the conductive properties imparted by the conductive pigment are also imparted to corrosion-inhibiting coatings which are laid down on a metal substrate from a composition which comprises a thermosettable organic resin, a corrosion inhibitor selected from the group consisting of a convertible chromium compound, phosphoric acid or a salt or an ester of a phosphoric acid, or a mixture of two or more of said inhibitors. A convertible chromium compound is one which may be reduced on the surface of the hot metal substrate to the trivalent state from the hexavalent state. Examples of such a corrosion inhibiting composition are described in U.S. Pat. Nos. 4,026,710; 3,713,904; 4,352,899; 4,461,857, 4,958,109; 4,544,686; and 4,554,213, all of which are incorporated herein by reference.

The aqueous compositions of the invention also may contain small amounts (e.g., 0.1 to 5% $_w$) of organic solvents and from 0 to about 1% $_w$ defoaming agents. An example of a type of organic solvent which is useful are the dibasic acid esters and commercial mixtures of dibasic acid esters available from DuPont under the general trade designation "DBE". The compositions of the DBE materials and other useful organic solvents are discussed and illustrated elsewhere in this specification. A reactive silicone dispersion in mineral oil containing no colloidal silica sold under the trademark BUBBLE BREAKER 3056 A from Witco Corporation is an example of a foaming agent useful in this invention.

The aqueous compositions of the present invention may be prepared by mixing the various components utilizing techniques well known to those skilled in the art. The order of mixing may be varied. In one embodiment, the chromium trioxide is dissolved in water and then the water dispersed epoxy is added followed by other ingredients. Mixing can be accomplished by conventional mixing procedures such as, for example, with the use of high speed agitation using a homo mixer or a dispersion mill. Mixers such as Brabender and Banbury mixers also can be utilized for preparing the aqueous compositions of the present invention.

The aqueous compositions of the present invention are relatively stable one-package systems but may be supplied as indefinitely stable two- and three-package systems providing excellent basecoat treatments for metal substrates. The basecoats are adherent, flexible, and corrosion-resistant. The basecoats may be easily applied utilizing known coil coating processes and by other known techniques including dipping, spraying, roller coating, bar coating, etc. The aqueous basecoat compositions of the present invention are generally applied to the metal substrates in sufficient amounts to provide a coating, on a dry basis of from 15 to 500 mg/ft$^2$ although heavier or lighter coatings may be applied. They can be applied to a variety of metallic substrates such as cold rolled and hot rolled steel, aluminized steel, and on galvanized surfaces such as hot-dipped galvanized and electro-galvanized (pure zinc or zinc-nickel) steel, galvalume, galvaneal, etc. After application of the aqueous coating composition to the metal substrate, the coating is dried and generally baked at an elevated oven temperature of from 100°–2400° F., preferably between about 400°–700° F. to achieve a 390°–450° F. peak metal temperature. The coated substrates are formable and may be weldable.

E-coatability of the coated metal substrate is maintained at about 450 mg of the dried corrosion-preventive coating per square foot of coated metal. That weight of corrosion preventive coating is predicated on an E-coat dry film thickness of from about 1 mil to about 1.4 mils achieved on an E-coat line configured to deposit a 1.2±0.1 mil dry film over a conventional, phosphated cold rolled steel sheet.

The corrosion-resistant characteristics of the coating composition deposited on the cold rolled steel is determined by subjecting coated steel panels to the ASTM Salt Spray Test ASTM B-117. In this test, a scratch (scribe) is made through the paint coating with a sharp instrument so as to expose the underlying metal. The scratched panel is then placed in a chamber at about 95° F. where it is contacted with a spray of 5% aqueous salt solution. During the test, the panels are observed to determine the time of failure. A coated panel is considered to fail this test when it delaminates or shows evidence of blistering.

The adhesion and flexibility of the primer films on the metal substrate is determined by use of the Olsen Button Test utilizing a Tinius-Olsen testing machine with a ⅞-inch diameter ball and a 1-inch diameter die or equivalent. The Tinius-Olsen or equivalent machine is used to gradually form a reverse dome on the coated metal. A panel is inserted into the machine and secured over the forming ball. A wheel on the side of the machine is gradually rotated until an agreed-upon deformation is achieved. The forming ball is then retracted and the panel removed from the machine.

The formed area is tested for adhesion by taping the formed area with scotch tape an agreed-upon number of times, and the amount of coating removed by the scotch tape is compared to photographic standards and rated 1 through 8 with 8 being perfect or no coating removal.

The weldability of the coated steel panels also is determined by attempting to spot weld two panels together face-to-face and face-to-back. The panels are coated on one side only.

The lubricity of coatings containing PTFE but not a conductive pigment is shown in the following examples of the preparation and testing of coating compositions and cured coatings containing it.

EXAMPLE A

While stirring 30 parts of an aqueous solution containing 70% by weight of the Resin 3540, 2.5 parts of the PE/PTFE powder sold as 523XF by Micropowders, Inc. was added and mixing continued to achieve homogeneity before 30 parts of an aqueous solution of 2.5 parts of chromium trioxide and 1 part of 85% phosphoric acid were added. A portion of this composition was diluted 1:1 with water and coated on a steel panel with a No. 6 wire-wound drawdown bar. The coated panel was baked to a peak metal temperature of 450° F. The coefficient of friction ($\mu_c$), as measured by ALTEK and a drawbead simulator, was 0.08. The coating withstood a 4 minute coil cleaning process and its repaintability was satisfactory. The PTFE was 3.49% of the weight of the total solids content of the aqueous composition.

EXAMPLE B

The general procedure of Example A was repeated except that only 1.0 part of the PE/PTFE powder was used. The weight of the PTFE here was 1.5% of the total weight of the solids. Again, $\mu_c$=0.08. Repaintability was excellent and the panel passed the caustic cleaning test.

EXAMPLE C

The general procedure of Example A was again repeated except that only 0.5 part of the PTFE was used. Here, the COF was 0.18 but the higher value is believed to be caused by the fact that the wire wound drawdown bar strained some of the larger particles of the powder out of the composition and reducing even further the already small amount (0.76%) of lubricant calculated to be in the dry coating. The repaintability was still excellent and the panel passed the caustic cleaning test.

EXAMPLE D

The general procedure of Example A was repeated except that 10 parts of Polyfluo 200 powder was used and the panel was Galvanneal galvanized steel. Whereas the bare panel had a $\mu_c$=0.46; the panel coated with this composition had a 0.09 coefficient of friction. There was no apparent degradation of the film after 4 minutes of boiling in a caustic bath and no loss in the $\mu_c$ value. The adhesion of a primer over the thus coated panel was fair; there was no removal by Scotch tape of the primer after cross hatching and none in the Olsen Button Test after 0.35" and 0.50" draws. The knife scrape adhesion was fair.

EXAMPLE E

When the amount of Polyfluo powder in Example D was reduced to 5 parts, the $\mu_c$ was 0.09.

EXAMPLE F

A coating made according to the general procedure of Example A with the exception that 2.5 parts of the powder was used also had a $\mu_c$ of 0.08 and when the coated panel was repainted with Morton primer 645K8 and Morton topcoat PC 340 the intercoat adhesion was excellent. The coated panel passed a 0.45" Olsen Button Test, both direct and reverse, with no loss of adhesion.

In contrast to the very low coefficient of friction achieved with the PTFE, a coating made according to the general procedure of Example D except for the substitution of a polyvinylidene fluoride resin sold under the trademark Kynar for the PE/PTFE had a $\mu_c$=0.42 and one made with a poly(ethylene glycol) wax (PEG 600) in place of the PE/PTFE had a $\mu_c$=0.29 on electrogalvanized steel and is stripped off in boiling caustic solution. A panel of such steel with a coat in which the lubricant was PPG's TEMPCOAT had a coefficient of friction of 0.06 but the coat was completely removed by the boiling caustic.

The following table shows the effectiveness of the basecoat containing PTFE as a lubricant on a variety of metal substrates in comparison with mill oil. The coefficient of friction was measured by the drawbead simulator method. The percent of PTFE is on the total solids basis.

| Metal Substrate | Mill Oil | Coefficient of Friction PTFE/PE | |
|---|---|---|---|
| | | 1.5% | 3.45% |
| Cold rolled steel | 0.126 ± 0.004 | 0.082 ± 0.005 | 0.072 ± 0.005 |
| Electrogalvanized steel 60/60 | 0.153 ± 0.018 | 0.073 ± 0.006 | 0.065 ± 0.009 |
| Galvanized sheet | 0.136 ± 0.019 | 0.109 ± 0.015 | 0.085 ± 0.009 |

In general, the corrosion-resistant water-borne liquid pre-treating basecoat composition of this invention for metallic substrates may comprise:

| Constituents | Concentration (wt. %) |
|---|---|
| Water-dispersible epoxy resin | 2.1–19.3 |
| Chromium trioxide powder | 0.80–4.6 |
| Non-ionic surfactant | 0.05–0.5 |
| Conductive pigment | 0.25–15.0 |
| Polytetrafluoroethylene | 0.09–2.4 |
| Phosphoric acid | 0.5–2.7 |
| Water | 29.2–88.0 |
| Strontium chromate | 0.0–10.0 |
| Dibasic ester | 0.0–8.0 |
| Butyl Cellosolve | 0.0–30.0 |
| 2-propoxyethanol | 2.0–5.0 |
| Defoaming agent | 0.0–1.0 |

In addition to the improved corrosion resistance and low coefficient of friction afforded by the lubricant-containing coating composition, the color of the metal substrate may be changed by the addition of a solvent soluble dye to the aqueous dispersion of the epoxy resin, chromium trioxide, and any optional components of the aqueous composition before it is applied to the substrate. Indeed, as an outgrowth of the investigation into the colorization of the epoxy resin based composition, it has been discovered that other aqueous organic resin-based compositions containing at least one water-dispersible or emulsifiable thermosetting resin and a reducible source of trivalent chromium and/or phosphoric acid, may be tinted by the addition of a solution of such a dye to the mixture of resin, water, chrome compound, and other components. Addition of the dye to either the resin or the chrome component before they are mixed is not suitable. The corrosion resistance of the coating derived from the tinted compositions is not diminished and its appearance may this be altered for aesthetic or identification purposes. Resin-bearing corrosion resistant coating compositions such as are described in the aforementioned U.S. Pat. No. 3,713,904 exemplify colorizable alternatives to the aqueous epoxy resin-based compositions described hereinabove. Colorizable commercial products are sold under the Oakite F-1 trademark and by Parker AmChem under the NR-2 mark. Curing of the colorized products may still be carried out in accordance with the manufacturer's instructions.

The utility of the aqueous compositions of the present invention as basecoats for metal substrates is illustrated in the following examples. All parts are by weight unless otherwise stated.

EXAMPLE 1

Component A of a coil coating composition of this invention was made by dissolving 12.18 parts of chromium trioxide and 1.0 part pf phosphoric acid in 86.82 parts of water.

Component B was made by slowly adding 13.1 parts of DBE solvent to 65.3 parts of the EPI-REZ 3540-WY-55 epoxy resin emulsion with moderate agitation, and then adding 12.0 parts of water, also with moderate agitation. After the resin, water, and solvent are well mixed, 4.6 parts of MICROPOWDER 523 XF lubricant (50/50 mixture of PE and PTFE), and 5.0 parts of TISMO potassium titanate fiber (Otsuka Chemical Co., Ltd) are dispersed in the aqueous emulsion with good agitation.

The aqueous coil coating composition of this invention was then made by blending equal weights of components A and B with moderate agitation for 3 minutes at ambient temperature.

The resulting aqueous coil coating composition of this invention was coated on a steel panel with a No. 6 wire-wound drawdown bar. The coated panel was baked to a peak metal temperature of 450° F. to give a dry coating weight of 418 mg/square foot. The coefficient of friction ($\mu_c$), as measured by ALTEK was 0.05. The thus coated panel was then electrocoated in a trial run on a production E-coat line to give a satisfactory coating having a dry film thickness (DFT) of 1.40 mils.

In contrast to the electrocoating results achieved with the product of Example 1, a panel having a coating weight of 407 mg/square foot of the same composition except that it did not contain a conductive pigment and electrocoated in the same manner had a DFT of 0 to 0.70 mil.

EXAMPLE 2

The general procedure of Example 1 was followed except that the amount of the MICROPOWDER lubricant was 3.1 parts and the amount of water was 13.5 parts. A panel coated with the resulting product is expected to be electrocoated at least as well as the panel coated with the product of Example 1.

Although the basecoats deposited on metal substrates by the aqueous compositions of the present invention provide improved corrosion-resistance, it is generally desired to apply primers and top coatings to the basecoat treated metal for various purposes including further corrosion-resistance, aesthetics, etc. In addition to providing corrosion-resistance and weldability properties to the metal substrates, the basecoat generally improves the adhesive bond between additional coatings and the metal substrate. In other words, the presence of the basecoat on the metal substrate improves topcoat adhesion.

The primer or topcoats which can be applied over the basecoat may be deposited from aqueous or solvent systems, and the primer and topcoats may or may not be weldable. Many commercially available primers and topcoat compositions are available and can be applied over the basecoat compositions of this invention.

In one embodiment, liquid coating compositions which are useful in particular as primer coatings over the basecoatings of the invention comprise (A) at least one cross-linkable thermoplastic resin,
(B) at least one organic solvent,
(C) at least one flow control agent,
(D) at least one cross-linking agent for the thermoplastic resin. Additionally, these coating compositions may optionally, and generally will contain one or more of the following components: suspending aids, pigments, other resins and polymers, corrosion-inhibitors, phosphoric acid or an alkylated phosphoric acid, adhesion promoters, etc., and zinc and/or ferro alloys if the coating is to be weldable.

A variety of cross-linkable thermoplastic resins can be utilized in the preparation of these coating compositions. In one embodiment, the cross-linkable thermoplastic resins are cross-linkable thermoplastic polyesters. Particularly useful in the coating compositions of the present invention are linear saturated polyester resins containing hydroxyl groups. The linear saturated polyester resins may be characterized by a hydroxy number of from about 5 to about 60 and more generally by a hydroxyl number of from about 5 to about 15. The molecular weight of the linear saturated polyester resins range from about 5000 to about 50,000 or more. Linear polyester resins having a hydroxyl number of from about 5 to about 15 and a molecular weight of from about 10,000 to about 20,000 are particularly useful-in this invention. The linear polyesters generally may be derived from a mixture of aromatic dicarboxylic acids and a mixture of glycols. The aromatic dicarboxylic acids include terephthalic acid, bibenzoic acid, ethylene bis- p-oxy-benzoic acid, 2,6-naphthalic acid, orthophthalic acid, isophthalic acid, etc. Mixtures of terephthalic and isophthalic acids are particularly useful. The glycols which are used in the preparation of the linear polyesters may be characterized by the general formula

HO(Y)—OH wherein Y is a hydrocarbyl group containing from 2 to 10 carbon atoms. The diols preferably are selected from the group consisting of ethylene glycol, 1,2- and 1,3-propanediol, 1,4-butanediol, neopentyl glycol, 1,6-hexanediol, etc. A particularly useful mixture is a mixture of ethylene glycol and neopentyl glycol.

A particularly useful linear polyester containing hydroxyl groups is derived from a mixture of terephthalic acid, isophthalic acid, ethylene glycol and neopentyl glycol. The relative amounts of the four components may be varied over a wide range. For example, the polyester resin can be derived from mixtures comprising from about 20 to about 60 mole percent of terephthalic acid, from about 15 to about 50 mole percent of isophthalic acid, and from 10 to about 50 mole percent of the glycol mixture.

The polyesters used in the liquid coating compositions useful for depositing primer coatings include the other polyesters which are described above as being useful in combination with the epoxy resins in the aqueous coating compositions. Both of the specific polyesters identified as Polyester-1 and Polyester-2 also can be used in the primer coating composition.

The linear saturated polyester resins which are utilized in the preparation of the liquid coating compositions of this invention exhibit good adhesive strength, elasticity, scratch-resistance and impact resistance.

Polyesters which may be utilized in the primer coating compositions of the present invention also are available commercially. One such group of polyester resins are available from the Nobel Dynamit Company under the general trade designation Dynapol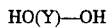. These high molecular weight linear saturated polyesters are characterized as having a hydroxyl number of from about 5 to about 60 and molecular weights of from about 3000 to about 18,000. Specific examples include Dynapol L205 characterized as having a molecular weight of 15,000 and a hydroxyl number of 10; Dynapol L206 having a molecular weight of 18,000 and a hydroxyl number of 8; and Dynapol LH812 having a molecular weight of about 3000 and a hydroxyl number of 35.

The primer liquid coating compositions are dissolved or suspended in at least one organic solvent which may be an aliphatic organic solvent or an aromatic organic solvent of mixtures thereof. Most generally, the solvent system will comprise a mixture of aliphatic and aromatic solvents. Typically, the aromatic solvent will be characterized by a boiling point of from about 350° to 410° F. The useful aliphatic solvents include ketones such as methylethyl ketone, methylisobutyl ketone, acetone, isophorone, butyl carbitol, diacetone alcohol, lower alkyl ethers of various glycols and acetates, lower alkyl acetates, etc.

Particularly useful solvents are the solvents available from DuPont under the general trade designation DBE (dibasic esters). The DBE's are refined dimethyl esters of adipic, glutaric and succinic acids. They are available individually and as mixtures. For example, the product identified as DBE has an ester content of 99.5% minimum and the esters comprise from 10 to 25% by weight of dimethyl adipate, 55 to 75% by weight dimethyl glutarate, and 15 to 25% by weight dimethyl succinate. A typical DBE composition is reported to comprise 17% dimethyl adipate, 66% dimethyl glutarate, 16.5% dimethyl succinate and 0.2% methanol. Another dibasic ester mixture available from DuPont under the designation DBE-3 comprises 89% by weight dimethyl adipate, 10% by weight dimethyl glutarate, 0.5% by weight dimethyl succinate and less than 0.1% methanol. The use of the liquid DBE solvents also appears to improve the leveling characteristics of the coatings deposited from the liquid compositions.

The primer coating compositions of the present invention also contain at least one flow control agent. Various flow control agents generally used with resin coating compositions (e.g., paints) can be utilized, and many of these are resins such as acrylic flow-modifying resins commercially available from a variety of sources. The polyacrylic resins may be of the methyl-methacrylate type; ethylene vinyl acetate resins; etc.

The primer coating compositions useful in the present invention also contain at least one cross-linking agent for the cross-linkable thermoplastic resin. A variety of cross-linking materials may be utilized with the polyesters, and these include, for example, aminoplasts (amino resins), e.g., urea formaldehyde and melamine formaldehyde and their alkoxy derivatives, phenol formaldehyde resins, epoxy resins, isocyanates, etc. Examples of useful isocyanate cross-linking agents include toluene diisocyanate (TDI), 4,4'-methylene-bis(diphenyl) diisocyanate, a 2:1 molar adduct of toluene diisocyanate and diethylene glycol, 1,6-hexamethylene diisocyanate, adducts of toluene diisocyanate and trimethylol propane, etc. The polyisocyanates used as cross-linkers may be blocked with thermally unstable blocking agents such as phenols, alcohols, etc. The weight ratio of polyester/cross-linker in the compositions of the invention may be varied between about 95/5 to about 60/40 or even less. Melamine resins are also useful cross-linking agents for the polyesters. An example of such a cross-linking agent is hexamethoxy methyl melamine.

The primer coating compositions also may contain various suspending aids such as silica powder, silane treated silica, quaternary amine treated magnesium aluminum silicate (Bentone-NL Industries) etc. When included in the coating compositions, the suspending aid may be present in an amount of from about 0.1 to about 2% by weight.

Pigment powders also can be, and generally are included in the primer coating compositions of the invention. The choice of pigment will depend on the particular color or colors desired in the primer coating. The pigments may be organic pigments and/or inorganic pigments, although inorganic pigments are generally utilized. The amount of pigment incorporated into the primer coating compositions of the present invention will be from about zero to about 25% by weight of the total weight of the coating composition.

Carbon blacks are well known color pigments often utilized in black polymer formulations. Among the carbon blacks which may be utilized as color pigments in the present invention are furnace blacks, channel blacks, and lamp blacks. The pigment powder also may be metal powders, metal oxides and other inorganic compounds such as barium sulfate. Among the metallic oxides which can be utilized as pigments are zinc oxide, aluminum oxide, magnesium oxide, iron oxide red, iron oxide yellow, chrome oxide green and titanium oxide white. Other inorganic pigments which may be utilized to provide desired colors include zinc sulfide, cadmium sulfoselenide, cadmium mercury, zinc chromate, cobalt aluminate, chrome cobalt-alumina, ultra-marine blue and lead carbonate.

Corrosion-inhibitors also may be included in the primer coating compositions. The amount of corrosion-inhibitor may be varied from about zero to about 11% by weight. Strontium chromate powder is a particular example of a corrosion-inhibitor useful in the primer coating compositions of the present invention.

Adhesion promoters may be incorporated into the primer coating compositions in amounts up to 5% by weight. An example of a class of useful adhesion promoters are the epoxy phosphate esters. Epoxy phosphate esters generally are prepared by reacting an epoxy resin with phosphoric acid in an organic solvent. Other polymers or resins may be included to modify the composition and properties of the epoxy phosphate esters. In one process, a polyepoxide is added to a heated mixture of organic solvent and phosphoric acid while maintaining the mixture at an elevated temperature such as about 100° C. The epoxy resins which can be utilized in the process may be any polyepoxide having an epoxide equivalency in excess of 1. The epoxy resins described above as being useful in the aqueous compositions (basecoat formulations) are examples of epoxy resins which can be converted to phosphate esters and used in the primer compositions. Diglycidyl ethers of the various bis-phenols such as bis-phenol A having an average molecular weight in the range of 350–7000 are useful. The amount of phosphoric acid utilized should be sufficient to provide from about 0.03 to about 0.9 mole of the acid per epoxy equivalent in the polyepoxide.

The preparation of epoxy phosphate esters useful as adhesion promoters in the primer coating compositions is described in the prior art such as in U.S. Pat. Nos. 4,425,451; 4,461,857; and 4,598,109, and these patents are hereby incorporated by reference for their disclosures of methods for preparing epoxy phosphate esters as well as the epoxy phosphate esters described in these patents.

A specific example of the preparation of an epoxy phosphate ester useful in the primer coating compositions is as follows:

Epoxy Phosphate Ester Example 1:

A mixture of 291.6 parts of butyl Cellosolve, 50.4 parts of Xylol and 114 parts of methyl isobutyl ketone is prepared with agitation. An inert gas (carbon dioxide) is bubbled through the liquid, and 483.6 parts of Epon 1001 (diglycidyl ether of bis-phenol A having an average molecular weight of 1000 and an epoxide equivalent weight of 500, Shell Chemical) and 187.2 parts of RJ-101 copolymer, a styrene-allyl alcohol copolymer from Monsanto, are charged to the reactor while applying some heat to effect complete dissolution. The mixture is cooled to about 140° F. if necessary, and at a temperature between 100°–140° F., 73.2 parts of 85% phosphoric acid are added. This reaction is exothermic, and the temperature of the reaction is controlled by cooling if necessary to insure that the reaction temperature does not exceed 200° F. After about 0.5 hour, the reaction mixture is cooled and filtered. The filtrate is the desired epoxy phosphate ester containing about 64% non-volatile materials.

In addition to the epoxy phosphate ester adhesion promoter, the primer coating compositions also may include a small amount such as from zero up to about 5% by weight of an epoxy resin. Any of the epoxy resins mentioned heretofore in this specification can be utilized. Specific examples of epoxy resins which may be included in the primer coating compositions include Epon 1007, Epon 1001, Epon 828, etc.

Phosphoric acid or an alkylated phosphoric acid also may be included in the primer coating compositions. When utilized, the phosphoric acid or alkylated phosphoric acid concentration will be from about 0.1 to about 2% by weight based on the weight of the total composition.

In one embodiment, the constituents and the concentration of the various constituents in a non-weldable liquid primer coating composition is as follows:

| Constituents | Concentration (wt. %) |
| --- | --- |
| *Polyester resin A | 10.0–28.8 |
| **Aromatic solvent B | 5.0–29.7 |
| ***Dibasic ester | 7.9–34.5 |
| Propylene glycol monomethyl ester acetate | 1.0–28.5 |
| Silica powder | 0.1–1.5 |
| Titanium dioxide | 0–25.0 |
| Strontium chromate | 0–11.0 |
| ****Acrylic flow control agent | 0.2–1.5 |
| Epoxy phosphate ester adhesion promoter | 0.1–1.0 |
| *****Epoxy resin | 0–5.0 |
| ******Blocked aliphatic polyisocyanate | 1–10 |

*Polyester resin A is a linear saturated polyester which has a molecular weight of about 14000–15000 and a hydroxyl number of about 8–10.
**Aromatic solvent B has a boiling point of typically 350–410° F.
***Dimethyl ester of adipic acid, glutaric acid and/or succinic acid or equivalent material.
****Copolymer of butyl acrylate and stearyl methacrylate or equivalent material.
*****Hexamethylene diisocyanate resin or equivalent material, said composition having a bake temperature of up to about 450° F. to provide a flexible, crack-resistant coating on steel and/or galvanized and aluminized metal substrates.

It will be understood that the polyester resin is the principal constituent of the above-described non-weldable primer coating compositions. In one preferred embodiment, the polyester resin is dissolved in a suitable combination of solvents which include an aromatic solvent, a dibasic ester and propylene glycol monomethyl ester acetate. The titanium dioxide and strontium chromate are optional but generally desired. The flow control-agent, bodying agent (silica powder) and adhesion promoter are utilized to adjust certain physical characteristics of the coating and the product, and these can be substituted with equivalent materials.

The following is a specific example of the preparation of a liquid non-weldable primer composition useful in the invention. Primer Composition Example 1:

A mixture of 24.6 parts of a solution of 30 parts polyester resin Dynapol L-205 in 70 parts of DBE, 6.1 part of titanium dioxide, 7.2 parts of strontium chromate, 0.2 parts of silica (Aerosil 200), 5.1 parts of DBE, 2.8 parts of aromatic solvent and 0.2 parts of an acrylic flow-modifier is prepared by sand milling. The mill is rinsed with a mixture of 4.3 parts of the polyester solution (30% solids) and 2 parts of aromatic solvent, and the rinse is added to the original mixture. Under agitation, there are added an additional 40 parts of the polyester solution, 3.15 parts of aromatic solvent, 1.7 parts of Epon 828, 2.15 parts of blocked aliphatic isocyanate (Mobay 3175) and 0.5 part of the Epoxy Phosphate Example 1 product. Agitation of the mixture is continued and 0.1 part of 85% phosphoric acid and 0.2 part of dibutyl tin dilaurate are added. If necessary, the viscosity can be adjusted with DBE.

The above-described non-weldable liquid primer coating compositions are useful as primer coatings on metal substrates which have previously been coated with the basecoat compositions of the present invention.

The present invention also relates to the use of weldable liquid primer coating compositions over the basecoat compositions of the present invention which have been described previously. The components of the weldable liquid primer coating compositions of the present invention may be essentially the same as those utilized in the non-weldable liquid primer coating compositions such as described above although generally in different amounts and with the exception that the weldable compositions contain zinc powder and/or ferro alloy powders. The zinc powder and the ferro alloy powders utilized in the primer coating compositions are the same types as used in the basecoat compositions of the invention described earlier. Generally, the weldable liquid primer coating compositions also differ from the non-weldable primer coating compositions and the relative amounts of the various constituents. Thus, improved weldable liquid primer coating compositions useful in the present invention generally comprise:

(A) from about 3 to about 20% by weight of at least one thermoplastic resin, (B) from about 5 to about 60% by weight of at least one organic solvent, (C) from about 30 to about 70% by weight of zinc powder, (D) from about 0.5 to about 10% by weight of a cross-linking agent for the thermoplastic resin, (E) from about 0.1 to about 2% by weight of silica powder, (F) from about 0.5 to about 2% by weight of an organic liquid lubricant, and (G) from about 1 to about 80% by weight based on the weight of zinc powder (C), of di-iron phosphide.

In one embodiment, phosphoric acid or an alkylated phosphoric acid is included in the weldable compositions, and amounts of from about 0.5 to about 3% of phosphoric acid are often beneficial. In one embodiment, the improved weldable liquid primer coating compositions of the present invention which are useful for application to metallic substrates comprise:

| Constituents | Concentration (wt. %) |
|---|---|
| Polyester resin A | 4.0–14.9 |
| Propylene glycol monomethyl ester acetate | 2.1–11.3 |
| Aromatic solvent B | 0–18.6 |
| Dibasic ester C | 5.0–18.6 |
| Blocked aliphatic polyisocyanate | 0.0–10.0 |
| Silica powder | 0.1–1.0 |
| Zinc powder | 42.8–61.7 |
| Liquid organic lubricant | 0.5–1.5 | said compositions having a bake temperature of up to about 450° F. and even up to about 500° F. to provide a flexible crack-resistant coating on steel and on galvanized and aluminized metal substrates.

The following are specific examples of the preparation of liquid weldable primer compositions which are useful as primer compositions over the basecoats of the present invention.

Primer Composition Example 2

A mixture of 26 parts of Polyester Resin of Example 2, 4 parts of Polyester Resin Example 1, 35 parts of DBE solvent and 35 parts of an aromatic solvent (Amsco G) is prepared. To 7 parts of this mixture contained in a mixing vessel, the following components are added with stirring: 0.80 part of Epon 828, 2.00 parts of a blocked aliphatic diisocyanate (Mobay 3175), 9 parts of DBE solvent, 0.20 part of silica (Aerosil 200), 40.0 parts of No. 64 zinc dust, and 15.0 parts of ferro phosphorus (Fe2P). After all the components have been thoroughly mixed, 1 part of hexamethoxy methyl melamine and 0.2 part of a morpholine salt of paratoluene sulfonic acid are added. After these materials are dispersed, a mixture containing 2 parts of butanol and 0.5 parts of 85% phosphoric acid is added with agitation. If necessary, the viscosity can be adjusted by the addition of small amounts of DBE solvent.

Primer Composition Example 3

To 27 parts of the initially prepared resin solvent mixture described in Primer Composition Example 2, the following components are added with agitation: 0.80 part of Epon 828, 2.0 parts of the blocked aliphatic diisocyanate, 9 parts of DBE solvent, 0.2 part of Aerosil 200, and 55 parts of ferro phosphorus. When all of these ingredients are thoroughly mixed, 1 part of hexamethoxy methyl melamine and 0.2 part of the morpholine salt of paratoluene sulfonic acid are added with agitation. Finally, a mixture of 2 parts of butanol and 0.5 part of 85% phosphoric acid is added with stirring and the viscosity is adjusted, if necessary, with additional DBE solvent.

The primer coating compositions can be applied to metal substrates by any technique known in the art including, for example, dipping, spraying, roller coating and bar coating. The primer coating compositions of the present invention are applied to the metallic substrate to provide a film which when dried and cured will result in a film thickness of about 0.1 to about 1.2 mils, generally about 0.1–0.5 mil. When the primer coating composition is applied over the basecoat composition of the present invention, the basecoat composition is dried prior to the application of the primer coat, and after the primer coat is applied, it is dried and baked at a peak metal temperature of from about 150° F. to about 500° F., and more generally from about 390° F. to about 500° F. to provide the desired corrosion-resistant coating.

When a weldable coated metal is desired, then both the basecoat and the primer coat may be of the weldable type.

The primer coat is applied to deposit a dry film thickness of about 0.1 to 0.8 mil and more generally from about 0.2 to 0.6 mil. The metal substrates coated in accordance with the procedures and with the compositions of this invention can be readily and satisfactorily overcoated or topcoated with commercial high-performance coatings such as appliance coatings and automotive coatings.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. An aqueous composition comprising:
   (A) an organic resin component consisting essentially of at least one water-dispersible or emulsifiable epoxy resin,
   (B) a non-ionic emulsifier,
   (C) chromium trioxide,
   (D) a conductive pigment selected from the group consisting of antimony doped tin oxide and potassium titanate fiber; and
   (E) water.

2. The composition of claim 1 also containing (F) phosphoric acid or an alkyl phosphoric acid.

3. The composition of claim 1 characterized further by the presence of
   (G) polytetrafluoroethylene powder having a particle size of from about 0.01μ to about 30μ as a lubricant.

4. The composition of claim 3 wherein the polytetrafluorethylene is contained in a mixture of polyethylene and polytetrafluoroethylene.

5. The composition of claim 1 wherein the organic resin component consists essentially of at least one water-dispersible or emulsifiable epoxy resin or a mixture of resins containing more than 50% by weight of at least one water-dispersible or emulsifiable epoxy resin.

6. An aqueous composition comprising:
   (A) from about 2 to about 25% by weight of an organic resin component consisting essentially of at least one water-dispersible or emulsifiable epoxy resin or a mixture of resins containing more than 50% by weight of at least one water-dispersible or emulsifiable epoxy resin,
   (B) from about 0.05 to about 0.5% by weight of a non-ionic emulsifier,
   (C) from about 0.5 to about 5% by weight of chromium trioxide,
   (D) from about 0.001 to about 50% by weight of the total solids of polytetrafluoroethylene as a lubricant,
   (E) from about 0.25 to about 15.0% by weight of a conductive pigment selected from the group consisting of antimony doped tin oxide and potassium titanate fiber,
   (F) from about 25 to about 97% by weight of water, and
   (G) from 0 to about 10% strontium chromate.

7. The composition of claim 6 also containing (H) from about 0.5 to about 5% by weight of phosphoric acid or an alkyl phosphoric acid.

8. The composition of claim 6 wherein the resin component (A) is a mixture of an epoxy resin and at least one halogen-containing thermoplastic polymer.

9. The composition of claim 6 wherein the resin component (A) is a mixture of an epoxy resin and at least one thermoplastic polyester resin.

10. The composition of claim 6 wherein the water-dispersible or emulsifiable epoxy resin has a molecular weight of from about 300 to about 100,000.

11. The composition of claim 6 wherein the epoxy resin has an epoxide equivalent weight of from about 150 to about 10,000.

12. The composition of claim 6 wherein the epoxy resin (A) has an epoxide equivalent weight of from about 1000 to about 3000.

13. The composition of claim 8 wherein the halogen-containing thermoplastic polymer is a fluorine-containing vinyl polymer.

14. The composition of claim 6 containing from about 10 to about 20% by weight of (A) the epoxy resin and from about 0.5 to about 1.5% by weight of (C) chromium trioxide.

15. The composition of claim 9 wherein the polyester resin is a polymer derived from at least one aromatic dicarboxylic acid and at least one glycol.

16. A water-borne liquid coating composition comprising:
   (A) from about 2 to about 25% by weight of at least one water-dispersible or emulsifiable epoxy resin characterized as having an epoxide equivalent weight of from least about 1000 to about 3000,
   (B) from about 0.05 to about 0.5% by weight of a non-ionic emulsifier,
   (C) from about 0.5 to about 5% by weight of chromium trioxide,
   (D) from about 0.001 to about 50% by weight of the total solids of polytetrafluoroethylene powder having a particle size of from about 0.01μ to about 30μ as a lubricant,
   (E) from about 0.25 to about 15.0% by weight of a conductive pigment selected from the group consisting of antimony doped tin oxide and potassium titanate fiber,
   (F) from about 25 to about 97% by weight of water, and
   (G) from about 0.5 to about 3% by weight of phosphoric acid.

17. The coating composition of claim 16 also containing from about 0.5 to about 15% by weight of a thermoplastic polyester resin.

18. The coating composition of claim 16 wherein the epoxy resin is a diglycidyl ether of a bis-phenol.

* * * * *